(12) United States Patent
Furusawa et al.

(10) Patent No.: US 7,455,410 B2
(45) Date of Patent: Nov. 25, 2008

(54) ILLUMINATING APPARATUS AND PROJECTOR

(75) Inventors: Makoto Furusawa, Azuminu (JP); Akira Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 347 days.

(21) Appl. No.: 11/428,482

(22) Filed: Jul. 3, 2006

(65) Prior Publication Data
US 2007/0002578 A1    Jan. 4, 2007

(30) Foreign Application Priority Data
Jul. 4, 2005    (JP)    ............................. 2005-194642

(51) Int. Cl.
    *G03B 21/28*    (2006.01)
(52) U.S. Cl. ........................... 353/94; 353/99; 362/551; 362/561; 362/234; 385/133; 385/901
(58) Field of Classification Search ................. 353/94, 353/98, 99; 362/551, 559, 560, 561, 234, 362/237; 385/11, 133, 901
See application file for complete search history.

(56) References Cited

U.S. PATENT DOCUMENTS

| 7,360,900 | B2 * | 4/2008 | Sakata et al. ................... 353/20 |
| 2005/0018149 | A1 * | 1/2005 | Takeda et al. ................. 353/99 |
| 2007/0252954 | A1 * | 11/2007 | McGuire et al. ............... 353/20 |

FOREIGN PATENT DOCUMENTS

| JP | A-2000-056266 | 2/2000 |
| JP | A-2003-202523 | 7/2003 |
| JP | A-2003-262795 | 9/2003 |

* cited by examiner

*Primary Examiner*—William C. Dowling
(74) *Attorney, Agent, or Firm*—Oliff & Berridge, PLC

(57) ABSTRACT

An illuminating apparatus includes: a light source that emits a source light; and a light guiding module that has an overlap rod portion which can pass luminous fluxes traveling in different directions therethrough and has a returning member which returns the luminous fluxes having passed through the overlap rod portion at least once so that the luminous fluxes enter the overlap rod portion in directions different from the previous time, whereby the source light is made uniform.

9 Claims, 6 Drawing Sheets

ILLUMINATING APPARATUS AND PROJECTOR

BACKGROUND

1. Technical Field

The present invention relates to an illuminating apparatus which illuminates an optical modulating device such as a liquid crystal light valve, and a projector having the same therein.

2. Related Art

For a first projector, there is one which collects source light from a light source lamp, enters it into one end of a rod integrator through an opening that is disposed at the center of a reflecting mirror and obtains the luminous light of a single polarization component through a polarization separation device that is disposed at the other end (see JP-A-2003202523) In this case, in reciprocating the reflected light from the polarization separation device by the reflecting mirror, the polarization direction is changed by a wave plate disposed on an optical path, and thus the light is passed through the polarization separation device.

For a second projector, there is one which collects source light emitted from a light source lamp, causes it to enter one end of a rod integrator and subjects the light emitted from the other end side to polarization conversion by a polarization conversion unit formed of a polarization beam splitter and other devices and thus obtains the luminous light having a uniform single polarization component (see FIG. 14 in JP-A-2000-56266).

For a third projector, there is one which is provided with a solid light source on the incident end face of a rod and disposed with a light valve on the output end face of the rod through a lens (JP-A-2003-262795). In this projector, the light from the solid light source is made uniform in the rod, and emitted from the output end face. The output end face directly illuminates the light valve.

However, among the projectors above, in the first projector, a half of the components that first transmit through the polarization separation device are not made uniform sufficiently.

In addition, in the second and third projectors, the rod integrator makes the luminous light uniform. Thus, the targeted uniform light cannot be achieved unless the rod integrator is made long, and the unit of an illuminating apparatus tends to be increased in size.

SUMMARY

An advantage of some aspects of the invention is to provide a small-sized illuminating apparatus which can irradiate highly uniform luminous light, and a projector using the same.

An illuminating apparatus according to an aspect of the invention includes: (a) a light source that emits a source light, and (b) a light guiding module that uniformize the source light, the light guiding module having an overlap rod portion and a returning member; and wherein the overlap rod portion can pass luminous fluxes traveling in different directions therethrough, and the returning member returns the luminous fluxes having passed through the overlap rod portion at least once so that the luminous fluxes enter the overlap rod portion in directions different from the previous time.

In the illuminating apparatus, the returning member returns the luminous fluxes having passed through that overlap rod portion at least once so that the luminous fluxes enter the overlap rod portion in directions different from the previous time. Thus, the source light is allowed to pass through the overlap rod portion for multiple times while the generation of interference is prevented. Accordingly, the overlap rod portion can be used double or more, and the source light can be made uniform in a relatively small space. Therefore, a small-sized illuminating apparatus can be provided which makes the source light uniform in a small space.

In addition, in the illuminating apparatus according to a specific aspect or viewpoint of the invention, the returning member includes a mirror that bends an optical path. In this case, the luminous fluxes having passed through the overlap rod portion can be folded and returned in a small space, and the size of the illuminating apparatus can be reduced easily.

According to another aspect of the invention, the light guiding module has an extension rod part that is jointed to at least one end face not jointed to the returning member among a plurality of end faces disposed on the overlap rod portion. In this case, the targeted uniformity can be achieved not only by the overlap rod portion and the returning member but also by the extension rod part.

According to another aspect of the invention, the overlap rod portion and the extension rod part are each formed of a solid transparent member, and are jointed to each other with an adhesive that has a refractive index lower than that of the overlap rod portion and the extension rod part. In this case, the jointing surfaces of the overlap rod portion to the extension rod part also serve as a total reflection surface which allows the luminous fluxes to propagate while they are reflected, the luminous fluxes travel in the direction orthogonal to the direction in which the extension rod part extends.

According to another aspect of the invention, the returning member is formed of a solid transparent member, and is jointed to the overlap rod portion with an adhesive that has a refractive index lower than that of the overlap rod portion and the returning member. In this case, the jointing surfaces of the overlap rod portion to the returning member also serve as a total reflection surface which allows the luminous fluxes to propagate while they are reflected, the luminous fluxes travel In the direction orthogonal to the end face jointed to the returning member.

According to another aspect of the invention, the overlap rod portion and the returning member perform wavefront splitting and superimposition of the luminous fluxes by internal reflection. In this case, the source light can be made uniform as it is passing through the overlap rod portion and the returning member.

According to another aspect of the invention, the light source includes a solid light source, and the apparatus further includes a polarization conversion member that converts a source light from the light source to a polarized light in a particular direction. In this case, a simple, small-sized light source using a solid light source can be provided, and the source light from this light source can be converted into the linear polarized light by the polarization conversion member to give the luminous light.

A projector according to an aspect of the invention includes: (a) a plurality of illuminating apparatuses described above for individual colors that generates a color light as a luminous light, (b) a plurality of optical modulating device for individual colors that modulates each of color lights from the illuminating apparatus for individual colors in accordance with image information, (c) a light combining optical system that combines and emits the light of an image in each color modulated by the optical modulating device for individual colors, and (d) a projection optical system that projects the light of the image combined through the light combining optical system.

Since the projector uses the illuminating apparatus having the features above, a small-sized, inexpensive color projector, for example, can be provided by a small-sized illuminating apparatus for individual colors which can make the light uniform in a small space. In addition, the luminous light from the illuminating apparatus is allowed to directly enter the optical modulating device not through the lens and so on. In this case, the optical modulating device can be disposed close to the rod end face and so on that is the output end of the light guiding module, and thus efficient illumination can be achieved.

A projector according to another aspect of the invention includes: (a) the illuminating apparatus described above, (b) an optical modulating device that modulates a luminous light from the illuminating apparatus in accordance with image information, and (c) a projection optical system that projects the light of an image formed by the light at the optical modulating device.

Since the projector uses the illuminating apparatus having the features above, a small-sized, inexpensive projector can be provided by a small-sized illuminating apparatus which can make the light uniform in a small space.

BRIEF DESCRIPTION OF THE DRAWINGS

The Invention will be described with reference to the accompanying drawing, wherein like numbers reference like elements.

DESCRIPTION OF EXEMPLARY EMBODIMENTS

First Embodiment

Figure 1:
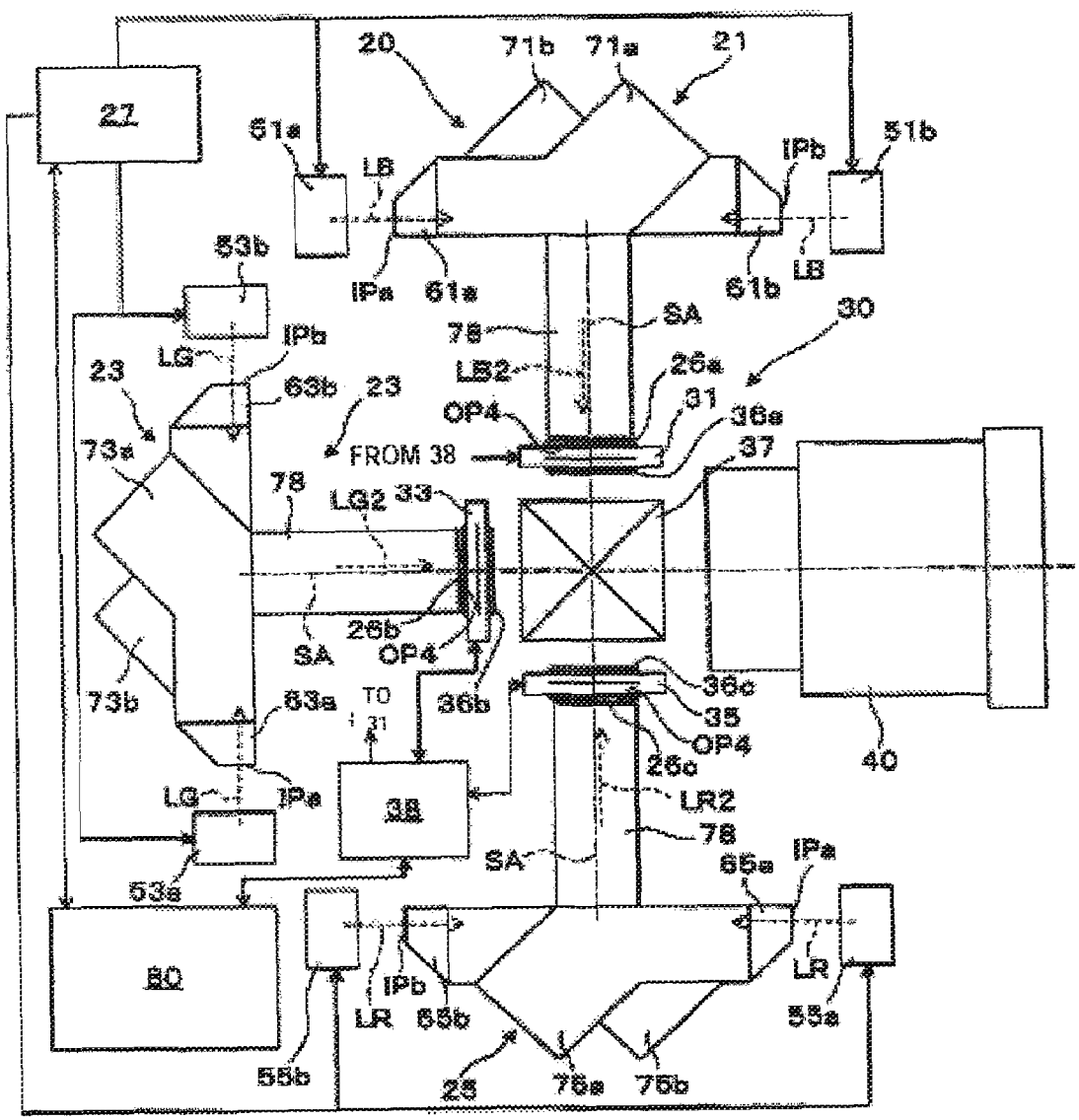
FIG. 1 shows a block diagram conceptually illustrating a projector according to a first embodiment.

FIG. 1 shows a block diagram conceptually illustrating the structure of a projector according to a first embodiment, which has an illuminating apparatus according to an embodiment of the invention therein.

A projector 10 has an illuminating section 20, an optical modulating section 30, a projection lens 40, and a control unit 80. Here, the illuminating section 20 has a blue light illuminating apparatus 21, a green light illuminating apparatus 23, a red light illuminating apparatus 25, and a light source drive unit 27. In addition, the optical modulating section 30 has three liquid crystal display panels 31 33 and 35 which are optical modulating devices, a cross dichroic prism 37 which is a light combining optical system, and a device drive unit 38 which outputs a drive signal to each of the liquid crystal display panels 31, 33 and 35.

In the illuminating section 20 described above, the blue light illuminating apparatus 21 has a pair of blue light source units 51a and 51b, a pair of polarization conversion units 61a and 61b, a pair of light guiding parts 71a and 71b, and an integrating rod part 78. Here, each of the blue light source units 51a and 51b is a blue light source which emits blue source light. Each of the polarization conversion units 61a and 61b is a blue polarization conversion member which converts the blue source light to a particular polarization component. Each of the light guiding parts 71a and 71b and the integrating rod part 78 are a blue uniform optical system which makes the blue source light uniform.

Figure 2:
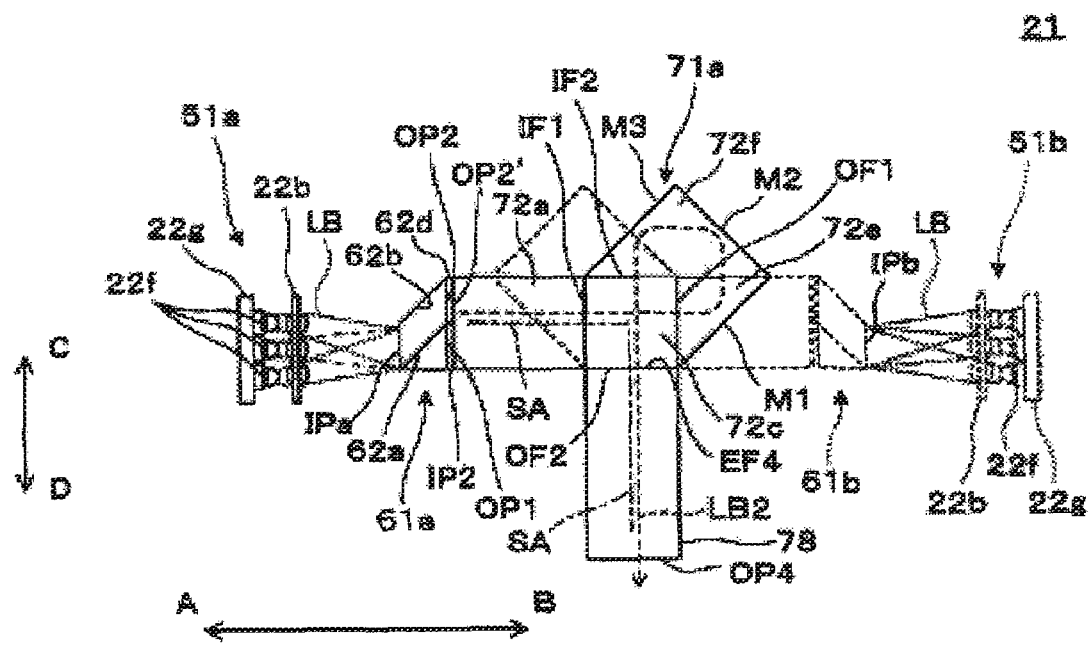
FIG. 2 shows a plan view depicting a blue light illuminating apparatus shown in FIG. 1.
Figure 3:
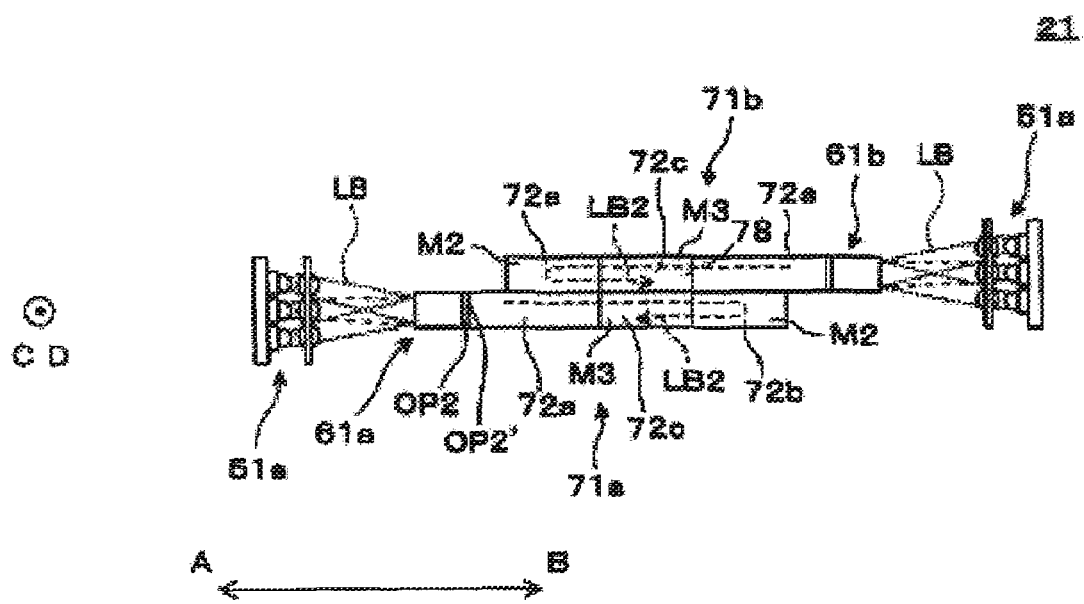
FIG. 3 shows a side view depicting the blue light illuminating apparatus shown in FIG. 1.

FIG. 2 shows a plan view depicting the blue light illuminating apparatus 21 shown in FIG. 1, and FIG. 3 shows a side view depicting the blue light illuminating apparatus 21.

In the blue light illuminating apparatus 21, the first blue light source unit 51a is formed in which a plurality of LEDs 22f which are light emitting devices called a solid light source or a semiconductor light source are mounted on a circuit board 22g in proper two dimensional arrangement (for example, in matrix arrangement), having a light gathering lens array 22b in which lens elements for shaping beams are separately disposed on the front side of each of the LEDs 22f that is a light source. Each of the LEDs 22f generates blue light included in blue (B) among three primary colors. The blue light taken out of the LED 22f, that is, a first source light LB passes through the light gathering lens array 22b, and enters the incident end of the first polarization conversion unit 61a, that is, an incident port IPa thereof. On this occasion, the blue light from each of the LEDs 22f is properly spread by each of the lens elements configuring the light gathering lens array 22b as well as it is shaped into an elliptic or rectangular beam in cross section that gathers at a predetermined position. More specifically, the blue light from each of the LEDs 22f is collected as a whole at the rectangular incident port IPa disposed on the first polarization conversion unit 61a, and all enters the incident port IPa as it is superimposed on each other.

The second blue light source unit 51b has the same structure as that of the first blue light source unit 51a, only different in the arrangement. Although the detailed description is omitted, in the second blue light source unit 51b, the blue light from each of the LEDs 22f on the circuit board 22g is collected by the light gathering lens array 22b, and all enters a rectangular incident port IPb disposed on the second polarization conversion unit 61b as it is superimposed on each other.

The first polarization conversion unit 61a is disposed on the output side of the first blue light source unit 51a as it faces thereto, which aligns the polarization direction of the first source light LB entering from the incident port IPa. The first polarization conversion unit 61a is formed by bonding a right angled triangle prism to a parallelogram prism, having a polarization separation film 62a which is sandwiched between the two prisms, a reflective film 62b which is formed on the opposite side of the polarization separation film 62a as the parallelogram prism is sandwiched therebetween, and a wave plate 62d which is disposed on the light guiding part 71a side of the parallelogram prism.

The polarization separation film 62a and the reflective film 62b are a polarization separation member that is formed of a dielectric multilayer formed on the slope of each of the prisms by vapor deposition, and arranged in the state in which they are tilted at an angle of 45 degrees with respect to a system optical axis SA. In the blue light that is the random polarized light from the first blue light source unit 51a, the former polarization separation film 62a transmits a linear polarized light component (for example, a polarized light P) in a particular direction, and reflects a linear polarized light component (for example, a polarized light S) in the direction orthogonal thereto. Consequently, it efficiently separates the two linear polarized light components orthogonal to each other. In addition, the latter reflective film 62b reflects one of the linear polarized light components reflected at the polarization separation film 62a (in the case above, the polarized light S), and bends the optical path. The reflective film 62b may be replaced by a mirror having a metal film deposited thereon. As described above, the first linear polarized light component having passed through the polarization separation film 62a (in the case above, the polarized light P) is emitted from an output port OP1 disposed on the right angled triangle prism side. The second linear polarized light component having been reflected at the polarization separation film 62a and the reflective film 62b (in the case above, the polarized light S) is emitted from an output port OP2 disposed on the parallelogram prism side. The wave plate 62d disposed as it faces the output port OP2 is a phase device which is formed of a half wave plate. It converts the second linear polarized light component reflected at the reflective film 62b and emitted from the parallelogram prism in the direction of the system optical axis SA (in the case above, the polarized light S) to the first linear polarized light component orthogonal thereto (that is, the polarized light P). Consequently, the first polarization conversion unit 61a can efficiently convert the first source light LB which entered the incident port IPa only to the first linear polarized light (in this case, the polarized light P), and emit it out of two output ports OP1 and OP2'.

The second polarization conversion unit 61b has the same structure as that of the first polarization conversion unit 61a only different in the arrangement, omitting the detailed description. The second polarization conversion unit 61b can efficiently convert the first source light LB which entered the incident port IPb only to the first linear polarized light(in this case, the polarized light P), and emit it on the second light guiding part 71b side.

The first light guiding part 71a is a light guiding module which has a first rod part 72a, a second rod part 72c, a first prism part 72e, a second prism part 72f, and reflecting mirrors M1, M2 and M3. Among them, the first rod part 72a is a solid prismatic rod integrator formed of glass, plastics and so on. It functions as an extension rod part. The first rod part 72a has an incident port IP2 which faces the output ports OP1 and OP2', of the first polarization conversion unit 61a, and the output side end face thereof is jointed to a first incident end face IF1 of the second rod part 72c. The second rod part 72c is also a solid prismatic rod integrator which is formed of glass, plastics and so on having the same refractive index as that of the first rod part 72a. It functions as an overlap rod portion. The second rod part 72c has a first output end face OF1 on the opposite side of the first incident end face IF1 jointed to the first rod part 72a. The first output end face OF1 is jointed to the incident side end face of the first prism part 72e. The first prism part 72e configures a returning member along with the second prism part 72f, which has the role to cause the luminous fluxes emitted from the second rod part 72c to enter the second rod part 72c from the direction different from the previous time. The first and the second prism parts 72e and 72f are a solid member which is formed of glass, plastics and so on having the same refractive index as that of the first and the second rod parts 72a and 72c. In addition, on the side surfaces on the outside of the first and the second prism parts 72e and 72f, the reflecting mirrors M1, M2 and M3 are formed which bend the traveling directions of the luminous fluxes propagating through inside these prisms, and these also configure a part of the returning member. The second prism part 72f has an output side end face which is adjacent to the surface to which the first prism part 72e is jointed, and which is orthogonal to the incident side end face of the first prism part 72e. The output side end face is jointed to a second incident end face IF2 of the second rod part 72c.

Some of the luminous fluxes which entered from the incident port IP2 of the first rod part 72a travel straight, and some are totally reflected at the side surface in the inner surface. However, as a whole, it travels along the system optical axis SA in a direction AB, and enters the first incident end face IF1 of the second rod part 72c. Some of the luminous fluxes which entered from the first incident end face IF1 of the second rod part 72c travel straight, or some are totally reflected at the side surface in the inner surface. However, as a whole, it travels along the system optical axis SA in the direction AB, and enters the first prism part 72e through the first output end face OF1. The optical paths of the luminous fluxes which entered the first prism part 72e are bent at an angle of 90 degrees by the reflecting mirror M1 which bends the optical paths, and the luminous fluxes enter the second prism part 72f. The optical path of the luminous fluxes which entered to the second prism part 72f are further bent at an angle of 90 degrees by the reflecting mirrors M2 and M3 which bend the optical path, and the luminous fluxes are outputted from the second prism part 72f. The outputted light from the second prism part 72f enters the second incident end face IF2 of the second rod part 72c. Some of the luminous fluxes which entered from the second incident end face IF2 of the second rod part 72c travel straight, or some are totally reflected at the side surface in the inner surface. However, as a whole, it travels along the system optical axis SA in a direction CD orthogonal to the direction AB, and enters the integrating rod part 78, described later, through the second output end face OF2.

Figure 4:
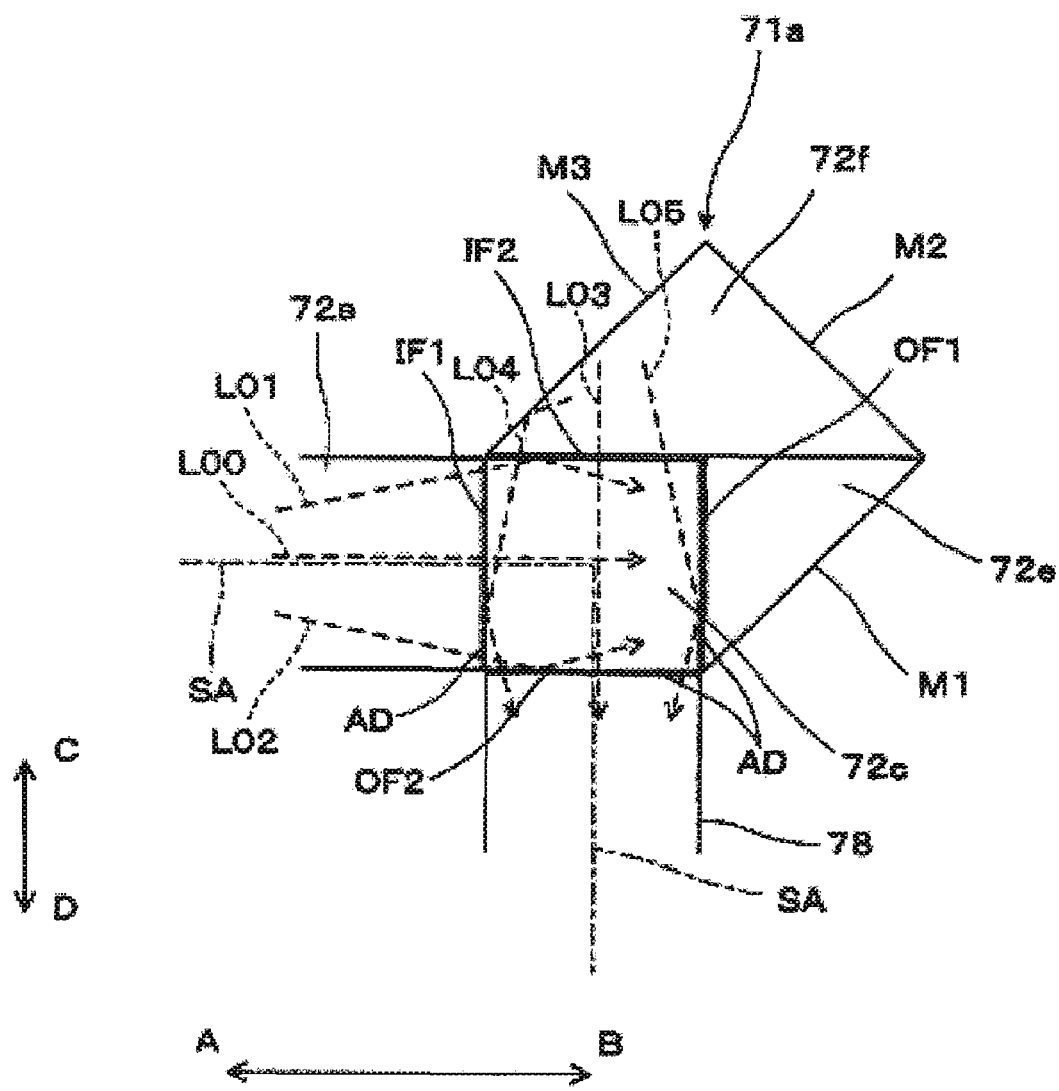
FIG. 4 shows a diagram depicting a partially enlarged blue light illuminating apparatus shown in FIG. 1 and the other drawings.

FIG. 4 shows a diagram illustrating light propagation in the second rod part 72c. Four side surfaces of the second rod part 72c are jointed to the rod parts 72a and 78 and the prism parts 72e and 72f therearound with an adhesive AD having a low refractive index. On this account, luminous fluxes L00, L01 and L02 enter from the first rod part 72a through the first incident end face IF1, and travel almost in parallel with the system optical axis SA. The luminous fluxes as a whole travel inside the second rod part 72c in the direction AB as they are totally reflected at the upper and lower side surfaces. In addition, luminous fluxes L03, L04 and L05 enter from the second prism part 72f through the second incident end face IF2, and travel almost in parallel with the system optical axis SA. The luminous fluxes as a whole travel inside the second rod part 72c in the direction CD although they are totally reflected at the right and left side surfaces. As described above, the luminous fluxes enter the second rod part 72c from the two directions, and thus the second rod part 72c can be utilized as the rod integrator twice. In addition, the first and the second prism parts 72e and 72f also make the luminous flux distribution uniform as one kind of the rod integrator. Therefore, the luminous fluxes that have passed through the second rod part 72c twice has an extremely high degree of uniformity with respect to the cross section direction vertical to the system optical axis SA.

The second light guiding part 71b has the same structure as that of the first light guiding part 71a only different in the arrangement, omitting the detailed description. The second light guiding part 71b serves as a light guiding module which causes the first source light LB to enter the second rod part 72c from the second polarization conversion unit 61b through the first rod part 72a, and again causes it to enter the second rod part 72c through the prism parts 72e and 72f. The first source light LB that has passed through the second rod part 72c twice is finally jointed to the integrating rod part 78.

The integrating rod part 78 is a solid prismatic rod integrator which is formed of glass, plastics and so on having the same refractive index as that of the first rod part 72a and so on. The integrating rod part 78 has an end face EF4 close to the second rod part 72c disposed in the first and the second light guiding parts 71a and 71b, which is jointed to the second rod part 72c through the end face EF4. The integrating rod part 78 is extended in the direction orthogonal to the first rod part 72a as the second rod part 72c is sandwiched, which allows the luminous fluxes having finally been outputted from the second rod part 72c to go out of an output port OP4 as a first luminous light LB2. The integrating rod part 78 configures the light guiding module along with the first and the second light guiding parts 71a and 71b, which functions as the extension rod part.

The operation of light in the blue light illuminating apparatus 21 will be described. The first source light LB generated at the first blue light source unit 51a passes through the first polarization conversion unit 61a to be formed in the linear polarized light in a particular direction, and travels as it is totally reflected at the inner side surface of the first light guiding part 71a. On this occasion, the first source light LB propagates through the first rod part 72a for one way, the second rod part 72c for one way twice, the prism parts 72e and 72f for one way, and the integrating rod part 78 for one way, while it is being made uniform, and it is outputted from the output port OP4 as the linear polarized light. On the other hand, the first source light LB generated at the second blue light source unit 51b passes through the second polarization conversion unit 61b to be formed in the linear polarized light in a particular direction, and it travels as it is totally reflected at the inner side surface of the second light guiding part 71b. On this occasion, the first source light LB propagates through the first rod part 72a for one way, the second rod part 72c for one way twice, the prism parts 72e and 72f for one way, and the integrating rod part 78 for one way, while it is being made uniform, and it is outputted from the output port OP4 as the linear polarized light. More specifically, the first source light LB generated at the first and the second blue light source units 51a and 51b is made uniform as it is converted to the linear polarized light, and is outputted from the output port OP4 as the first luminous light LB2 of highly uniform polarization.

Returning to FIG. 1, the green light illuminating apparatus 23 has a pair of green light source units 53a and 53b, a pair of polarization conversion units 63a and 63b, a pair of light guiding parts 73a and 73b, and an integrating rod part 78. Among them, the green light source units 53a and 53b have the structure as similar to that of the blue light source units 51a and 51b. However, each of LEDs incorporated therein generates green light included in green (G) among three primary colors. A second source light LG having the green light passes through a light gathering lens array, not shown, and all enters incident ports IPa and IPb of the polarization conversion units 63a and 63b as it is superimposed on each other. Each of the polarization conversion units 63a and 63b has the structure similar to that of the polarization conversion unit 61a shown in FIG. 2. The second source light LG having passed through the polarization conversion units 63a and 63b undergoes polarization separation, optical path bending, and polarization switching, and it is efficiently converted to the linear polarized light having a single component as similar to the case of the polarization conversion units 61a and 61b. It is further guided into the light guiding parts 73a and 73b having the same structure as that of the light guiding parts 71a and 71b shown in FIG. 2 and so on, and is jointed to the integrating rod part 78. A second luminous light LG2 having passed through the light guiding parts 73a and 73b and the integrating rod part 78 is made uniform with no loss by wavefront splitting and superimposition utilizing the reflection in the rod inner surface. It enters the green light liquid crystal display panel 33 through a first polarization filter 26b which is arranged oppositely to the output port OP4 of the integrating rod part 78 in the optical modulating section 30. Therefore, the area to be irradiated onto the liquid crystal display panel 33 is uniformly illuminated by the green linear polarized light.

The red light illuminating apparatus 25 has a pair of red light source units 55a and 55b, a pair of polarization conversion units 65a and 65b, a pair of light guiding parts 75a and 75b, and an integrating rod part 78. Among them, the red light source units 55a and 55b have the structure similar to that of the blue light source units 51a and 51b. However, each of LEDs incorporated therein generates red light included in red (R) among three primary colors. A third source light LR having the red light passes through a light gathering lens array, not shown, and all enters incident ports IPa and IPb of the polarization conversion units 65a and 65b as it is superimposed on each other. Each of the polarization conversion units 65a and 65b has the structure similar to that of the polarization conversion unit 61a shown in FIG. 2. The third source light LR having passed through the polarization conversion units 65a and 65b undergoes polarization separation, optical path bending, and polarization switching, and is efficiently converted to the linear polarized light having a single component as similar to the case of the polarization conversion units 61a and 61b. It is guided into the light guiding parts 75a and 75b having the same structure as that of the light guiding parts 71a and 71b shown in FIG. 2 and so on, and is further coupled to the integrating rod part 78. A third luminous light LR2 having passed through the light guiding parts 75a and 75b and the integrating rod part 78 is made uniform with no loss by wavefront splitting and superimposition utilizing the reflection in the rod inner surface. It enters the red light liquid crystal display panel 35 through the first polarization filter 26c which is arranged oppositely to the output port OP4 of the integrating rod part 78 in the optical modulating section 30. Therefore, the area to be irradiated onto the liquid crystal display panel 35 is uniformly illuminated by the red linear polarized light.

Each of the liquid crystal display panels 31, 33 and 35 is a light transmissive optical modulating device which switches the polarization direction of the luminous light in units of pixels in accordance with an image signal inputted from outside and thus two dimensionally modulates the luminous light of each color that comes from each units of the illuminating apparatus 21, 23 and 25 and enters each of the liquid crystal display panels 31, 33 and 35. On the incident side of each of the liquid crystal display panels 31, 33 and 35, the first polarization filters 26a, 26b and 26c are arranged as they face the incident plane of the panels, and they can illuminate each of the liquid crystal display panels 31, 33 and 35 with the polarization component having an increased degree of polarization. In addition, on the output side of each of the liquid crystal display panels 31, 33 and 35, the second polarization filters 36a, 36b and 36c are arranged as they face the out going plane of the panels, and can transmit only the polarization component that has passed through each of the liquid crystal display panels 31, 33 and 35 in the direction orthogonal to a particular direction. Here, the first polarization filter 26a, the liquid crystal display panel 31, and the second polarization filter 36a configure a blue liquid crystal light valve. The first polarization filter 26b, the liquid crystal display panel 33, and the second polarization filter 36b configure a green liquid crystal light valve. The first polarization filter 26c, the liquid crystal display panel 35, and the second polarization filter 36c configure a red liquid crystal light valve. More specifically, the luminous lights LB2, LG2 and LR2 come from each illuminating apparatus 21, 23 and 25, and enter the liquid crystal display panels 31, 33 and 35, respectively. They are two dimensionally modulated in the intensity by the liquid crystal display panels 31, 33 and 35. The light of an image in each color having passed through each of the liquid crystal display panels 31, 33 and 35 is combined at the cross dichroic prism 37, and emitted from one of the side surfaces thereof. The image of the combined light emitted from the cross dichroic prism 37 enters the projection lens 40 which is the projection optical system, and is projected onto a screen (not shown) at a proper magnification. More specifically, a color image that combines images of each color (blue, green, and red) formed on each of the liquid crystal display panels 31, 33 and 35 is projected onto the screen as video or a still image by the projector 10.

Second Embodiment

Figure 5:
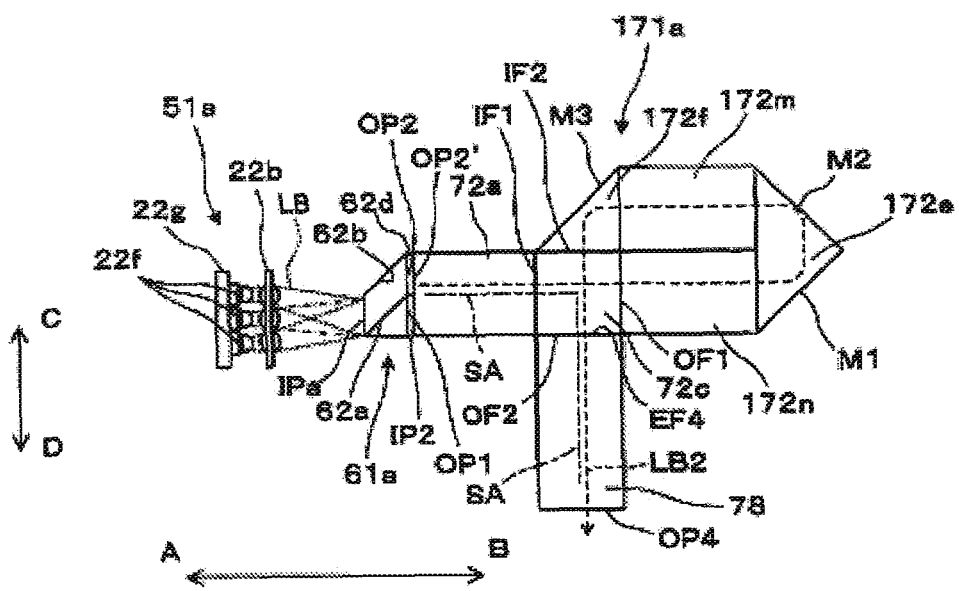
FIG. 5 shows a diagram illustrating a unit of an illuminating apparatus of a projector according to a second embodiment.

Next, a second embodiment according to the invention will be described with reference to FIG. 5. The basic configuration of a projector according to the embodiment is the same as that of the first embodiment, but the configuration of the illuminating apparatus is partially different from the first embodiment.

A blue light illuminating apparatus 121 shown in the drawing has a blue light source unit 51a, a polarization conversion unit 61a, a light guiding part 171a, and an integrating rod part 78. Among them, the light guiding part 171a has a first rod part 72a, a second rod part 72c, a third rod part 172n, a fourth rod part 172m, a pair of prism parts 172e and 172f, and reflecting mirrors M1, M2 and M3.

The third rod part 172n is jointed to a first output end face OF1 of the second rod part 72c, and is a solid prismatic rod integrator which is formed of glass, plastics and so on having the same refractive index as that of the first rod part 72a. The fourth rod part 172m is jointed to a second incident end face IF2 of the second rod part 72c through the second prism part 172f, and is also a solid prismatic rod integrator which is formed of glass, plastics and so on having the same refractive index as that of the first rod part 72a. The third rod part 172n is connected to the fourth rod part 172m through the first prism part 172e. The two prism parts 172e and 172f are a solid member which is formed of glass, plastics and so on having the same refractive index as that of the first rod part 72a. The rod parts 172m and 172n and the prism parts 172e and 172f configure a returning member along with the reflecting mirrors M1, M2 and M3, and have a role to cause the luminous fluxes emitted from the second rod part 72c to enter the second rod part 72c from the direction different from the previous time. In this case, the returning member is made sufficiently long to achieve further uniform luminous fluxes.

In addition, for the light source and the uniform optical system formed of the blue light source unit 51a, the polarization conversion unit 61a and the light guiding part 171a described above, another light source and another uniform optical system having the same function as that of them may be further provided, and the luminous fluxes from the light source and the uniform optical systems 51a, 61a and 171a may be coupled at the integrating rod part 78 as similar to the case shown in FIG. 2.

The blue light illuminating apparatus 121 is described above. The green light illuminating apparatus 23 and the red light illuminating apparatus 25 shown in FIG. 1 may have the structure similar to that of the blue light illuminating apparatus 121 shown in FIG. 5.

Third Embodiment

Figure 6:
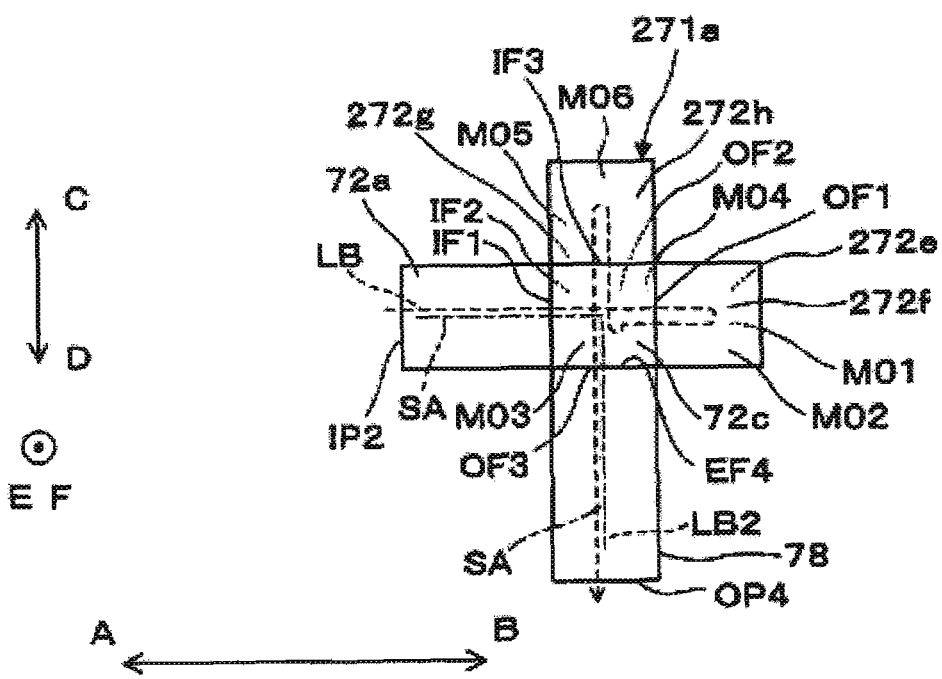
FIG. 6 shows a plan view depicting a unit of an illuminating apparatus of a projector according to a third embodiment.
Figure 7:
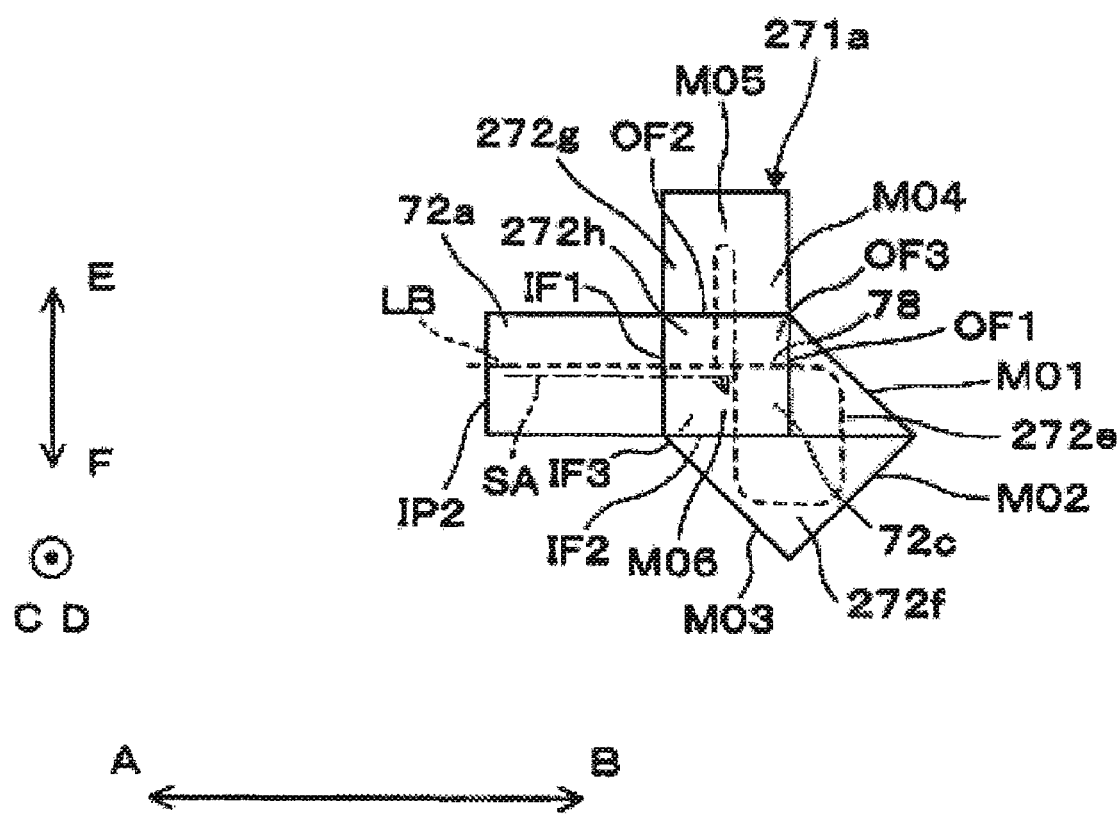
FIG. 7 shows a side view partially depicting a blue light illuminating apparatus shown in FIG. 6.

Next, a third embodiment according to the invention will be described. The basic configuration of a projector according to the embodiment is the same as that of the first embodiment, but the configuration of the illuminating apparatus is partially different from the first embodiment. FIG. 6 shows a front view partially depicting an illuminating apparatus, and FIG. 7 shows a side view partially depicting the illuminating apparatus.

In a blue light illuminating apparatus shown in the drawing, a light guiding part 271a has a first rod part 72a, a second rod part 72c, four prism parts 272e, 272f, 272g and 272h, and six reflecting mirrors M01, M02, M03, M04, M05 and M06.

The first prism part 272e is jointed to the first output end face OFI of the second rod part 72c. The second prism part 272f is jointed to the first prism part 272e and a second incident end face IF2 of the second rod part 72c. The third prism part 272g is jointed to a second output end face OF2 of the second rod part 72c. The fourth prism part 272h is jointed to the third prism part 272g and a third incident end face IF3 of the second rod part 72c. Each of the prisms parts 272e to 272h is formed of glass, plastics and so on having the same refractive index as that of the second rod part 72c. Each of the prisms parts 272e to 272h configures a returning member along with the reflecting mirrors M1 to M6 formed outside thereof, which has a role to again cause the luminous fluxes emitted from the second rod part 72c to enter the second rod part 72c twice from two directions different from the previous time.

A first source light LB from the first rod part 72a passes through the second rod part 72c in the direction AB through the first incident end face IF1 and the first output end face OF1, and again enters the second rod part 72c from the second incident end face IF2 through the first and the second prism parts 272e and 272f. The luminous fluxes having again entered the second rod part 72c propagate through the second rod part 72c in a direction EF. It is emitted from the second output end face OF2, and again enters the second rod part 72c from the third incident end face IF3 through the third and the fourth prism parts 272g and 272h. The luminous fluxes having again entered the second rod part 72c propagate through the second rod part 72c in the direction CD. It is emitted from the third output end face OF3, and enters the integrating rod part 78 through an end face EF4. When the light guiding part 271a described above is used, the number of times that the light passes through the second rod part 72c is increased, the returning member is made long sufficiently, and the luminous fluxes are made more uniform.

As described above, the blue light illuminating apparatus 121 is described. The green light illuminating apparatus 23 and the red light illuminating apparatus 25 shown in FIG. 1 may as well have the structure similar to that of the blue light illuminating apparatus 21 having the light guiding part 271a shown in FIGS. 6 and 7.

Fourth Embodiment

Figure 8:
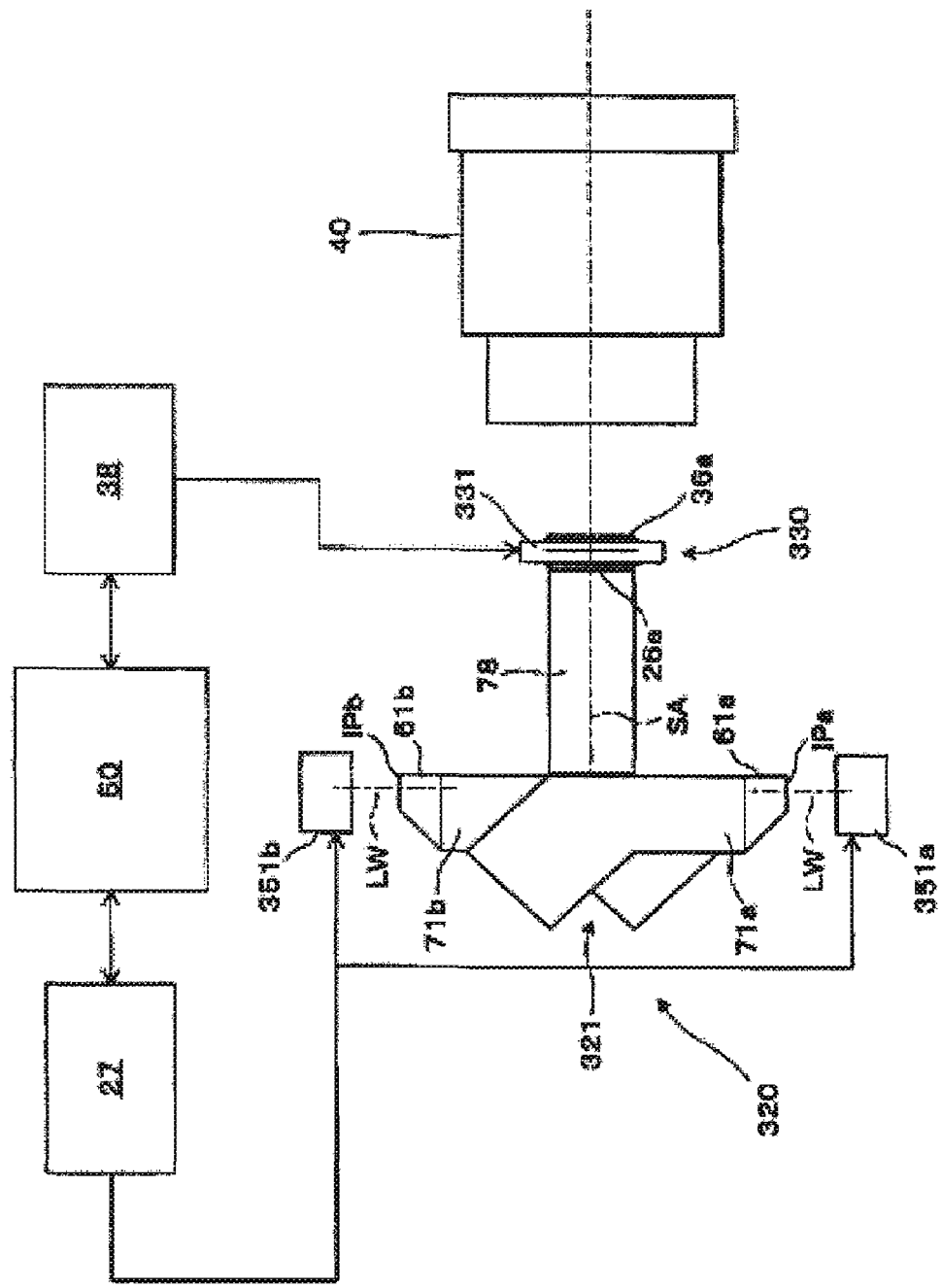
FIG. 8 shows a diagram illustrating a projector according to the fourth embodiment.

Next, a fourth embodiment will be described with reference to FIG. 8. A projector according to the embodiment is a so-called single panel projector in which the illuminating section 20, the optical modulating section 30 and the other units according to the first embodiment are properly modified in the projector 10 shown in FIG. 1.

A projector 310 has an illuminating section 320, an optical modulating section 330, and a projection lens 40. Here, the illuminating section 320 has an illuminating apparatus 321 which generates nearly white source light, and a light source drive unit 27. In addition, the optical modulating section 330 has a liquid crystal display panel 331 which is an optical modulating device, and a device drive unit 38 which outputs a drive signal to the liquid crystal display panel 331.

The illuminating apparatus 321 has a pair of white light source units 351a and 351b, a pair of polarization conversion units 61a and 61b, a pair of light guiding parts 71a and 71b, and an integrating rod part 78. Here, the white light source units 351a and 351b are a light source which emits a white source light LW. Each of the polarization conversion units 61a and 61b is a polarization conversion member which converts the source light LW to a particular polarization component. The light guiding parts 71a and 71b and the integrating rod part 78 are a uniform optical system which makes the source light LW uniform.

The white light source units 351a and 351b have the structure similar to that of the blue light source unit 51a shown in FIG. 2, except the specifications of wavelengths. Although the detailed description is omitted, in each of the white light source units 351a and 351b, each white light from LEDs is collected by a light gathering lens array, and all enters incident ports IPa and IPb disposed on each of the polarization conversion units 61a and 61b as it is superimposed on each other. The polarization conversion units 61a and 61b and the light guiding parts 71a and 71b are the same as those shown in FIGS. 1, 2, and so on, omitting the description.

The illuminating apparatus 321 shown in the drawing makes the source light LW uniform that is generated at the white light source units 351a and 351b while the light is being converted to the linear polarized light. The light is emitted as highly uniform polarized light, and illuminates the area to be irradiated onto the liquid crystal display panel 331. The light of an image having passed through the liquid crystal display panel 331 is incident to the projection lens 40 which is a projection optical system, and is projected on a screen (not shown) at a proper magnification. More specifically, an image formed on the liquid crystal display panel 331 is projected as video or a still image on the screen by the projector 310.

In addition, for the liquid crystal display panel 331, both of color and monochrome liquid crystal panels can be used.

The invention has been described in accordance with the embodiments above, but the invention is not limited to the embodiments. For example, in the embodiments, the liquid crystal display panels 31, 33 and 35 are used for optical modulation, but a micro mirror device may be used for optical modulation instead of the liquid crystal display panels 31, 33 and 35.

In addition, the polarization conversion units 61a, 61b, 63a, 63b, 65a, and 65b are not limited to those taken as an example. As long as the linear polarized light can be obtained from the random polarized light and so on, polarization conversion modules in various structures may be used.

In addition, the form and size of the second rod part 72c which is incorporated in the light guiding parts 71a and 71b and the others are not limited to those shown in the drawings, which can be freely modified in accordance with the form and so on of the area to be irradiated onto the liquid crystal display panels 31, 33 and 35. In addition, the path and direction to pass the luminous fluxes through the second rod part 72c for multiple times are also not limited to those shown in the drawings, which can be freely modified in accordance with purposes for use and so on.

The first rod part 72a, the integrating rod part 78, and the prism parts 72e and 72f and the others can be replaced by a hollow member which reflects the luminous fluxes in its inner surface.

In addition, in the first embodiment, the illuminating section 20 is not limited to the blue light illuminating apparatus 21, the green light illuminating apparatus 23 and the red light illuminating apparatus 25, which may be an illuminating apparatus having color more than one using the other wavelengths. In the illuminating apparatus for individual colors, a unit is used which is adapted to the wavelength for use as it corresponds to each of the color light source units 51a and 51b, 53a, 53b, 55a, 55b and so on, and thus a desired luminous light can be obtained.

The entire disclosure of Japanese Patent Application No. 2005-194642 filed Jul. 4, 2005 is expressly incorporated by reference herein.

What is claimed is:

1. An illuminating apparatus comprising:
    a light source that emits a source light; and
    a light guiding module that uniformize the source light, the light guiding module having an overlap rod portion and a returning member,
    the overlap rod portion can pass luminous fluxes traveling in different directions therethrough, and
    the returning member returns the luminous fluxes having passed through the overlap rod portion at least once so that the luminous fluxes enter the overlap rod portion in directions different from the previous time.

2. The illuminating apparatus according to claim 1, wherein the returning member includes a mirror that bends an optical path.

3. The illuminating apparatus according to claim 1, wherein the light guiding module has an extension rod part that is jointed to at least one end face not jointed to the returning member among a plurality of end faces disposed on the overlap rod portion.

4. The illuminating apparatus according to claim 3, wherein the overlap rod portion and the extension rod part are each formed of a solid transparent member, and are jointed to each other with an adhesive that has a refractive index lower than that of the overlap rod portion and the extension rod part.

5. The illuminating apparatus according to claim 1, wherein the returning member is formed of a solid transparent member, and is jointed to the overlap rod portion and the returning member with an adhesive that has a refractive index lower than that of the overlap rod portion and the returning member.

6. The illuminating apparatus according to claim 1, wherein the overlap rod portion and the returning member perform wavefront splitting and superimposition of the luminous fluxes by internal reflection.

7. The illuminating apparatus according to claim 1, wherein the light source includes a solid light source, and the apparatus further includes a polarization conversion member that converts a source light from the light source to a polarized light in a particular direction.

8. A projector comprising:
    a plurality of illuminating apparatuses according to claim 1 for individual colors that generates a color light as a luminous light;

a plurality of optical modulating devices for individual colors that modulates each of color lights from the illuminating apparatuses for individual colors in accordance with image information;
a light combining optical system that combines and emits the light of an image in each color modulated by the optical modulating devices for individual colors; and
a projection optical system that projects the light of the image combined through the light combining optical system.

9. A projector comprising:
an illuminating apparatus according to claim 1;
an optical modulating device that modulates a luminous light from the illuminating apparatus in accordance with image information; and
a projection optical system that projects the light of an image formed by the light at the optical modulating device.

* * * * *